United States Patent [19]

Powell, Jr.

[11] Patent Number: 4,663,057
[45] Date of Patent: May 5, 1987

[54] SWIMMING POOL CHLORINE INJECTION MEANS AND METHOD

[76] Inventor: Jonathan S. Powell, Jr., 5094 Tip Top Rd., Mariposa, Calif. 95338

[21] Appl. No.: 812,053

[22] Filed: Dec. 23, 1985

[51] Int. Cl.$^4$ .......................... F28G 1/00; F28G 1/16; F28G 9/00
[52] U.S. Cl. .................................... 210/754; 210/169; 210/198.1; 210/416.2
[58] Field of Search ..................... 210/754, 198.1, 169, 210/416.2, 755, 756, 205, 206, 541, 542

[56] References Cited

U.S. PATENT DOCUMENTS 4,531,571  7/1985  Moss .................................. 210/754

Primary Examiner—Frank Sever
Attorney, Agent, or Firm—Duane C. Bowen

[57] ABSTRACT

A chlorine injector for a swimming pool including a cylinder of chlorine, a disperser tube near the bottom of the pool, and a transfer tube therebetween. The disperser tube is formed of a fluorinated elastomer and has a multiplicity of discharge orifices formed by needle punctures normally closed but opening up responsive to pressure. A pressure regulator between the cylinder and the transfer tube having ports in contact with chlorine gas made of fluorinated material. Addition of chlorine to the pool being controlled by time of injection with constant pressure set by the pressure regulator and by fixed sizes of discharge orifices formed by the punctures under that constant pressure. Disk spacers supporting the disperser tube above the pool bottom.

12 Claims, 6 Drawing Figures

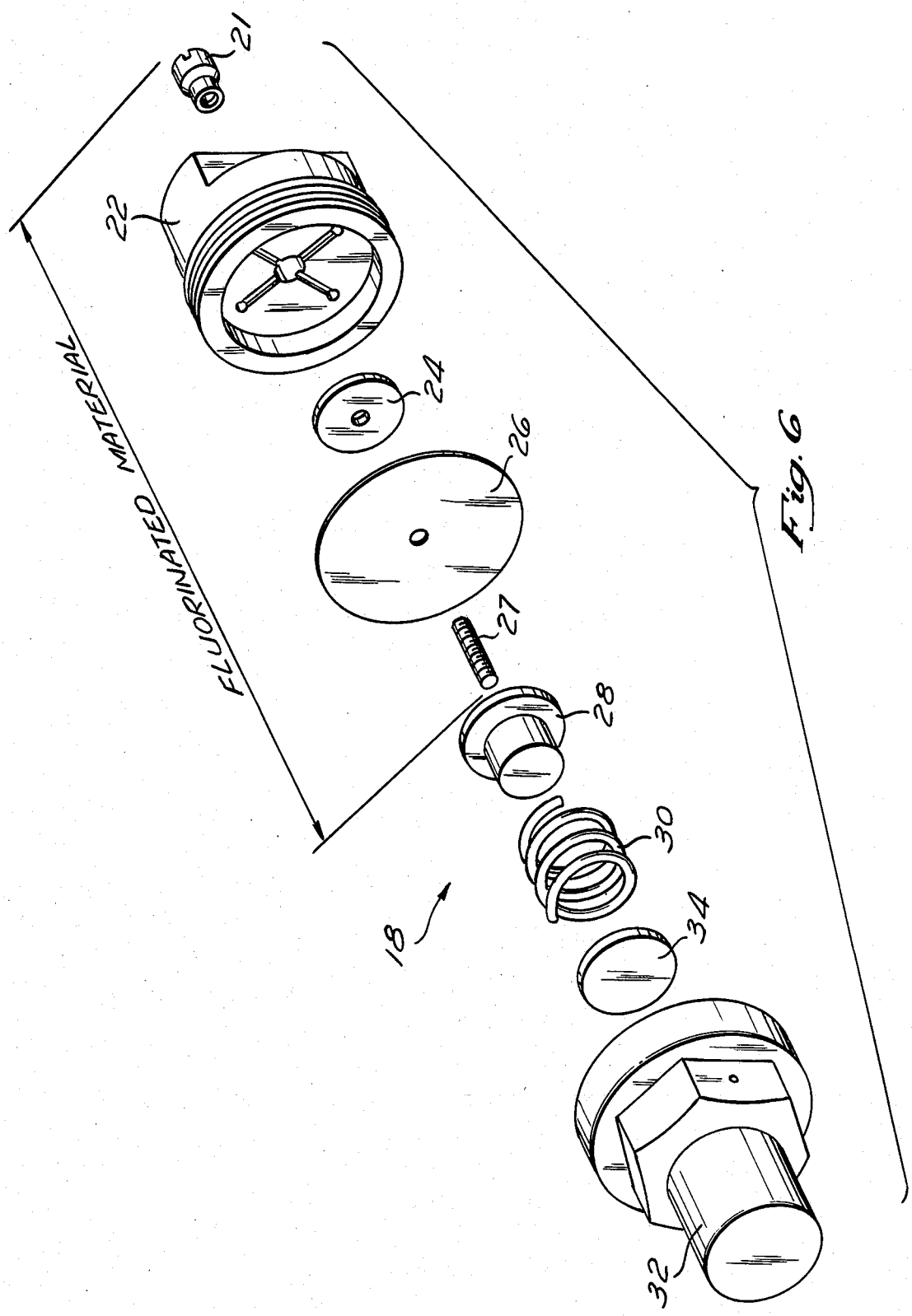

SWIMMING POOL CHLORINE INJECTION MEANS AND METHOD

BRIEF SUMMARY OF THE INVENTION, Background and Objectives

My invention concerns the injection of an amount of chlorine into a swimming pool measured by time resulting from a constant delivery pressure to an elastomeric disperser tube having needle punctures acting as a size of fixed sized orifices under that pressure.

For convenience, the specification and claims herein will use the expression "swimming pools", but spas are also serviced by pool services as to chlorine injection and the terms "swimming pool" or "swimmings pool" should be interpreted to include spas.

In the maintenance of swimming pools, pool services commonly are hired to visit the pool to perform maintenance and cleaning tasks. One important task is to restore the level of absorbed chlorine in the swimming pool water to a needed value. The level of absorbed chlorine is measured and the service person then knows the amount of chlorine needed to be added to restore the level of absorbed chlorine to the proper level in a pool of that size. Usually the amounts of chlorine are stated in terms of pounds of liquid chlorine. This practice is at least partly because in the past the way the service person knew how much was delivered from a container of liquid chlorine was by poolside weighing of the container before and after injection on some type of portable scale. Commonly, one or two pounds of chlorine is injected from a cylinder weighing as much as fifty pounds. Weighing the amount of chlorine injected to within ¼ pound, a desired accuracy, is very difficult with light weight portable weighing devices rugged enough to withstand rough usage and a chemical corrosive environment. Control of the flow of chlorine is by means of adjusting the cylinder valve. This is a sensitive adjustment and sometimes the flow is too great and the bubbles of chlorine are too large to be completely absorbed. Objectives of my invention include to provide a different manner of measuring injected chlorine than weighing chlorine cylinders and to control rate of injection of chlorine by other measures in addition to adjusting the cylinder valve. It is an objective of my invention to control the weight of chlorine injected by measuring the time of injection rather than to weigh the chlorine cylinder.

In the injection of chlorine, the liquid in the cylinder boils to liberate the gas and this gas is transfered through a disperser tube to the bottom of the pool at the deep end and dispersed into small bubbles by passing thru small holes in the wall of a closed end tube. The bubbles should be small enough that the chlorine dissolves in the water before reaching the surface. In the past the disperser tube has had holes drilled in a tube that would pass some bubbles too large to dissolve if the cylinder valve were opened too far. It is an objective to avoid that problem and, more specifically to avoid too large bubbles by use of a pressure regulator and by use of a multiplicity of punctures in an elastomeric disperser tube. It is a further objective to avoid plugging of holes in a disperser tube by using such punctures that open under pressure and close in absence of pressure.

Another objective is to provide fluorinated polymers in the disperser tube and in contact with chlorine in the pressure regulator so as to provide corrosion resistance.

A further objective is to provide a swimming pool chlorine injection means and method that best adapts to field conditions, considerations and objectives in the commercial swimming pool maintenance field. The ways the present means and method adapts to field conditions, considerations and objectives will be further discussed below in conjunction with the description of the invention.

My invention will be best understood, together with additional advantages and objectives thereof, when read with reference to the drawings.

DRAWINGS

FIG. 6 is an exploded perspective view of the pressure regulator assembly in my equipment.

DESCRIPTION

Figure 1:
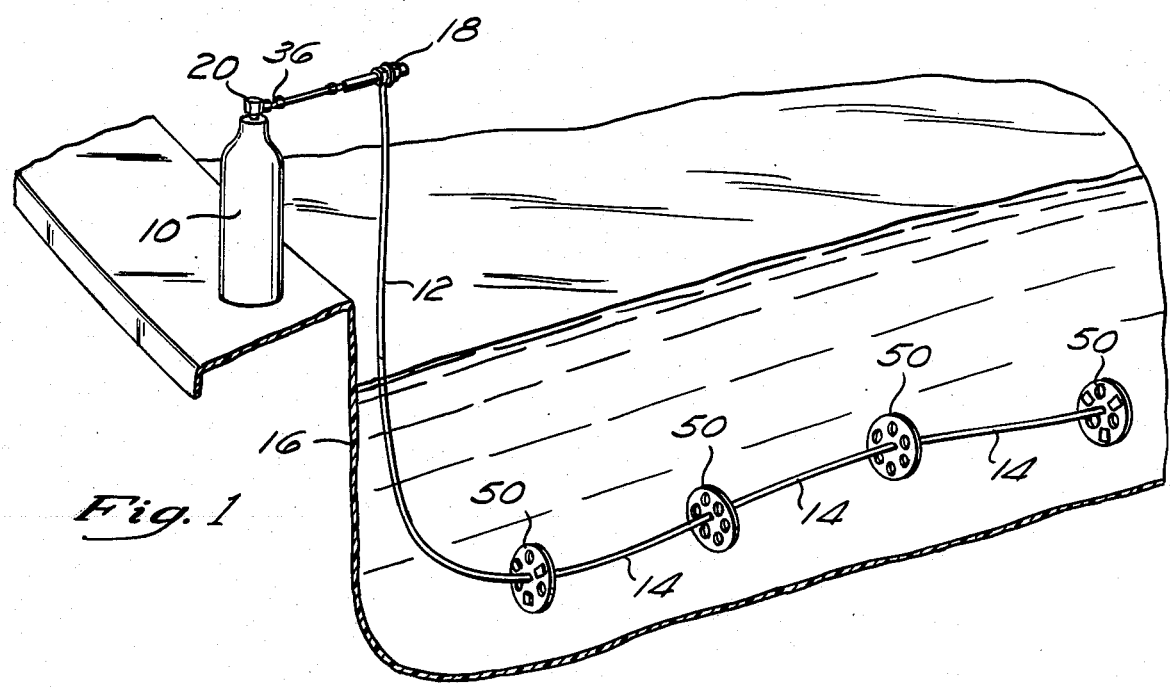
FIG. 1 is a perspective view of a specific embodiment of my chlorine injection equipment in a swimming pool.
Figure 2:
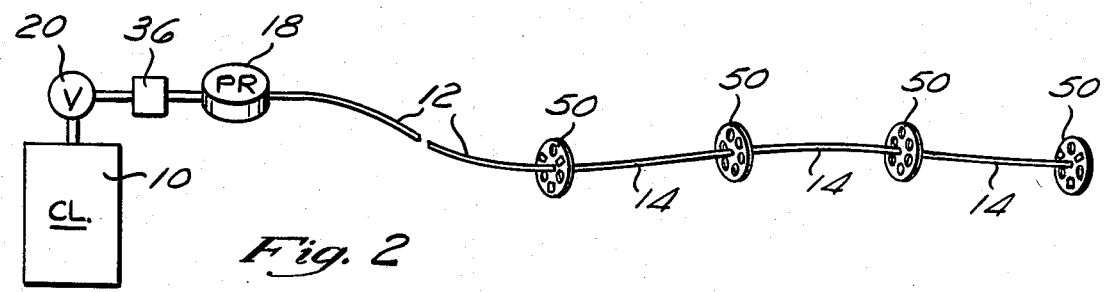
FIG. 2 is a view of my equipment schematically presented.

In commercial pool maintenance, it is desirable that operations be adapted for average workers that may include some people not careful in handling equipment or conducting operations. For example, some workers may subject equipment to rough usage, i.e., throw or drop apparatus in the bed of a pickup truck. Portable scales for weighing cylinders are especially subject to damage from rough usage. As will appear below, my system is to inject by timing rather than by weighing, so use of scales to govern amount of chlorine injected is avoided.

Some workers may be careless in opening liquid chlorine cylinder valves resulting in too large bubbles being injected from a disperser tube and an excessive rate of failure of chlorine to absorb in swimming pool water. Pressure in cylinders heated by the sun can get so high that too much gas may be emitted even when the valve is opened with care. An integral part of my system is to use a pressure regulator in measuring amount of chlorine being injected by unit of time and the pressure regulator also avoids excessive injection pressures.

As in many commercial activities, amount of time spent by a worker to accomplish a job is a primary consideration. Control of the amount of chlorine injected in my new system is by a stop watch and the service person can be conducting other maintenance operations while the stop watch is running. Use of a stop watch for injection control saves time over using a portable scale during chlorine injection in the prior practice. Another desirable objective is for the pool service person to by able in one trip to carry (usually to the backyard) everything needed for a pool maintenance, so this helps define applicable apparatus.

The primary components of my chlorine injection system include a cylinder 10 of liquid chlorine, a transfer tube 12 and a disperser tube 14. During injection, disperser tube 14 is disposed near the bottom of a swimming pool 16 filled with water, cylinder 10 is disposed at the side of pool 16, and transfer tube 12 connects cylinder 10 to disperser tube 14. All parts in contact with chlorine gas flowing from cylinder 10 should be formed from a fluorinated material such as TEFLON or VITON manufactured by du Pont or KYNAR PVDF manufactured by Penwalt. I prefer to use Viton fluoroelastomer for disperser tube 14 and transfer tube 12. A pressure regulator 18 is provided and I prefer to form parts of pressure regulator 18 in contact with chlorine gas of KYNAR PVDF.

As before indicated, one difficulty in injecting chlorine into a pool in prior practice is that when the cylinder valve 20 is opened or "cracked", flow may be excessive, even when the service person is careful, much less when the service person gets careless. Excessive flow means that gas bubbles 42 emitted from disperser tube 14 are too large and do not get sufficiently absorbed in the water in pool 16 above disperser tube 14 before they break the surface. Escape of chlorine from the water in pool 16 not only is wasteful and does not serve its sanitary purposes but also may damage plants in the pool area. This is one reason why I provide pressure regulator 18, preferably set about 30-35 psig. Pressure of chlorine gas in cylindrs 10 can get very high, i.e., when heated in the sun pressures of 150 psig are not uncommon. The level of pressure to tubes 12, 14 is set by regulator 18 at a level so that bubbles of gas 42 emitted from disperser tube 14 will not be excessive in size. The nature of the openings or outlets 40 from disperser tube 14, etc., is also influential on bubble size, i.e., if the openings 40 were too large then too large bubbles 42 might still be formed, a subject I will further discuss below. Controlling pressure out of cylinders 10 by watching a pressure gauge is not suitable because such gauges are too delicate for pool service usage wherein cylinders 10 may be dropped into pickup beds. Corrosion of gauges from chlorine gas also would be a problem.

The pressure regulator 18 depicted in FIG. 6 is of mostly conventional construction except for the use of VITON or KYNAR PVDF for parts in contact with chlorine gas. That material will accept to temperatures and corrosiveness of chlorine gas without significant deterioration. Such parts include valve 21, body 22, washer 24, diaphragm 26, and valve stud 27 that secures valve 21 to spring plate 28. I prefer KYNAR for parts other than the diaphragm which I prefer to make of VITON reinforced by glass filaments. Spring plate 28, spring 30, and cap 32 can be formed of metal as they are not in contact with the chlorine gas. Usually a pressure regulator has an adjusting screw acting on a spring adjust washer to vary the compression on spring 30. I prefer to omit such adjusting screw because pool service personnel might adjust the screw so the pressure regulator would no longer regulate at the preferred pressure. Instead I adjust compression of spring 30 with one or more washer or disc shims 34 at the outer end of spring 30, so service personnel are unable to adjust or tamper with the pressure regulator spring pressure setting. As pressure regulator 18 is of basically conventional operation, I will not burden this specification with a description of operation of its parts.

Transfer tube 12 is connected to cylinder 10 with a type of quick-disconnect coupling 36. Service personnel need to frequently change cylinders 10, as often as once for each pool serviced and may carry a half dozen cylinders 10 in the service vehicle. This is because when quantities of liquid chlorine are changed to gas in the process of feeding chlorine gas from cylinders 10, cooling occurs which reduces pressure in cylinders 10. Then a different cylinder needs to be used. When a used cylinder is disconnected, the relatively high temperatures external of the cylinder will gradually heat the cylinder contents again causing the chlorine liquid in the cylinder to boil and to reestablish gas pressure at a suitable level. A filter, not shown, may be also used between cylinder 10 and transfer tube 12.

A second reason to provide a pressure regulator 18 is that the addition of the pressure regulator to the pool chlorine injection system permits the amount of injected chlorine to be measured by time instead of by weight. Instead of using a portable scale to weigh chlorine cylinder 10 during injection, a stop watch is used to measure the time of chlorine injection. If the pressure of chlorine gas is established and if orifices in disperser tube 14 are fixed in sizes at that pressure, the amount of injected chlorine per unit of time can be established from prior charted data. To chart the amount of gas that will be injected per unit of time, one could weigh a chlorine cylinder during injection. It is more practical in production during charting to use air rather than chlorine gas and to use a flow meter to measure the air flow rather than to weigh the air during injection. Of course, the air involves no cost or disposal problem. A rate of five cubic feet of air injected per minute is the equivalent of one-half pound of chlorine per minute or one pound of chlorine in two minutes. Each new assembly of disperser tube 14, transfer tube 12, pressure regulator 18 and coupling 36 should be calibrated to confirm the rate that chlorine will be injected, although with proper manufacturing techniques the rates of injection will become somewhat uniform. An earlier manufacturing operation is to adjust each pressure regulator 18 to a selected value, i.e., 30-35 psig, by selection of shimming washers or discs 34. Experience has indicated that an injection rate of one pound of chlorine in two minutes can be controlled within plus or minus 0.05 pounds.

The design of the constant flow rate chlorine injector depends not only on pressure regulator 18 but also on a disperser tube 14 which has fixed sized orifices at the injection pressure. As before indicated, I have selected VITON fluoroelastomer to form disperser tube 14. This material has a hardness, Durometer A points, of 79. This material is able to handle the temperatures and corrosiveness of chlorine gas without significant deterioration.

I have discovered that a disperser tube 14 made from VITON fluoroelastomer has important advantages in my invention in addition to resistance to corrosiveness. The improvement involves the type of material and the nature of the outlet openings 40 in tube 14. The disperser is made by forcing thru the tube needles 0.035" in diameter. One configuration of punctures 40 but not the only one that would be workable is made by forcing a needle 60 thru both sides of the tube three times around the circumference 120° apart and by providing rings of these punctures 0.2" apart. One example is about 1,000 punctures 40 made this way. A second example is 500 punctures 40. The needle size is limited to a maximum size of 0.060" or bubbles of chlorine gas injected through openings 40 become so big as to break the surface of the water of a pool before being absorbed. Smaller needles 60 than 0.35" in diameter can be used but more punctures need to be made for the same rate of flow. Most of the pressure drop from regulator 18 occurs as the chlorine gas exits from disperser 14. The pressure of the gas in the disperser is adjusted by the regulator with the design that punctures 40 open enough to form small bubbles 42 which don't break the surface of the pool. Too high a gas pressure and insufficient punctures 40 would cause the gas to break the surface of the water at the flow rate desired.

Figure 3:
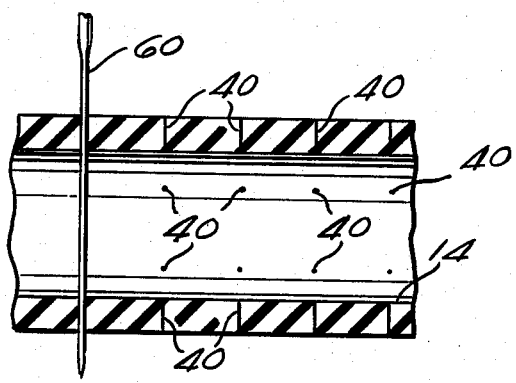
FIG. 3 is a sectional view of a disperser tube showing punctures forming outlets in the tube and a needle used to make the punctures.
Figure 4:
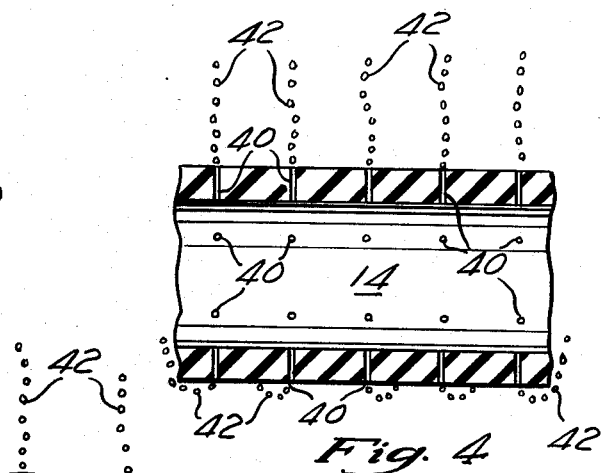
FIG. 4 is similar to FIG. 3 but shows the outlets expanded under pressure and passing bubbles.
Figure 5:
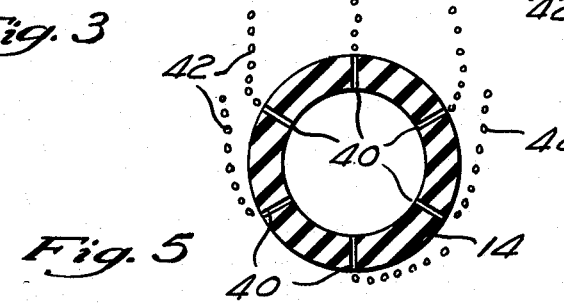
FIG. 5 is similar to FIG. 4 but the section is taken transversely of the tube.

FIG. 5 shows six openings 40 around the circumference of disperser tube 14. Examples of disperser tube dimensions are ⅜" O.D. and 3/16" I.D. FIG. 3 indicates tube 14 before gas pressure is applied in which the openings 40 are shown as a line, which means the needle punctures seem completely closed. In fact, when tube 14 is unpressurized, openings 40 only appear as faint marks on the surface of the tube. FIG. 4 indicated that under pressure openings 40 open up enough to inject gas in the form of bubbles 42 into the water in the swimming pool.

A peculiar feature of openings 40 in tube 14 is that if there are fewer openings they open wider to emit more bubbles per opening 40 or larger sized bubbles so that reduction in numbers of openings does not result in proportionately less gas flow. For example, consider a configuration in which pressure regulator 18 is set at 30–35 psig and the punctures 40 in VITON tube 14 has been pierced with 0.035" diameter needles 60. One thousand punctures 40 results in about 5.2 CFM of air flow, and five hundred punctures 40 results in about 3.26 CFM of air flow. This means that punctures 40 act as elastic orifices responsive to pressure, i.e., act as one size of orifices at one pressure and as different sized orifices at a different pressure. Punctures 40 evidently open wider if there are fewer openings to accommodate a given pressure. It appears the greater number of holes 40 the smaller bubbles 40 will be which should result in quicker absorption in water.

It was my prior practice to make the disperser tube 14 out of KYNAR PVDF and to drill openings 42 with a jeweler's drill, i.e., about 350 holes ¼" apart with a diameter of about 0.014". The KYNAR tube was hard and the outlet openings in it had no significant elasticity if any elasticity at all.

The advantages of the VITON fluoroelastomer over the prior sized tube with small holes drilled in it include:

1. The VITON tube disperser 14 produces much smaller bubbles 42 for better absorption in pool water.

2. The punctures can not become plugged as the holes in the rigid disperser do either from deposited impurities or by burrs bending back over the holes.

3. The punctures do not allow the back flow of water into the disperser when the flow of gas is stopped as does the rigid disperser. Water in a disperser with cold water below 48° F. can plug holes by the formation of solid chlorine hydrate.

4. It is much simpler and less time consuming to puncture a VITON rubber tube with needles 60 than to drill small holes in a rigid tube.

Disperser tube 14 can be several feet long. Openings 40 should not be too close together so that bubbles 42 from adjacent holes 40 will not coalesce to form larger bubbles. Also, if the outlet openings 40 were too close there might not be a sufficient volume of water above tube 14 to absorb the chlorine and that water could become oversaturated. Disperser tube 14 could have the form of a star or spider instead of the single length of tubing depicted. Disperser tube 14 should be spaced from the bottom of the pool because if it touches the pool surface the bubbles tend to coalesce into larger bubbles, so disks 50 are used to support all or most of tube 14 above the swimming pool bottom. Lead weights (not shown) may be attached to disks 50 to weigh down disperser tube 14.

Transfer tube 12 may be around fifteen feet long, to connect between cylinder 10 at the side of pool 16 to disperser tube 14 or the pool bottom. Disperser tube 14 is usually put in the deep end of pool 16 which may be eight or ten feet deep.

Apparatus to puncture tube 14 with needles 60 will be understood by those skilled in manufacturing operations. One way is to mount a needle in a drill press and support the tubing suitably to make the series of punctures. FIG. 3 has a representation of a needle 60 used to puncture tube 14.

Amount of chlorine to be injected into swimming pool water depends on pool size (usually 20,000 gallons, sometimes 40,000 gallons) and by measurement of the level of chlorine in the water. Then by consulting a chart developed by tests, the pool service person can tell how long to operate my new injection system in order to add the number of pounds of chlorine needed. While watching the time on a digital stop watch, the service person can conduct other pool service operations.

Having thus described my invention, I do not wish to be understood as limiting myself for the exact construction shown and described. Instead, I wish to cover those modifications of my invention that will occur to those skilled in the art upon learning of my invention and which are within the proper scope thereof.

I claim:

1. A chlorine injector for a swimming pool filled with water, comprising means to control weight of chlorine injected by measuring time of injection rather than by weighing chlorine cylinders, including:

(a) a container of liquid chlorine under pressure of chlorine vaporized into gas, a disperser tube near the bottom of said pool having outlets for chlorine gas to eject therefrom to dissolve in said water in said pool, and a transfer tube connecting said container to said disperser tube, (b) said disperser tube being formed of a fluorinated elastomer and said outlets being formed by a multiplicity of at least two hundred and fifty punctures formed by needles of about 0.035" diameter piercing said disperser tube, said punctures normally having a closed appearance but passing bubbles of chlorine gas under pressure and acting as fixed-sized orifices under a given gas pressure to limit gas flow therethrough, and (c) a pressure regulator set as 30–35 psig interposed between said container and said transfer tube so that the amount of chlorine being ejected from said disperser tube into said water in said pool can be measured by time of injection in view of constant pressure in said disperser tube governed by said pressure regulator and in view of said punctures acting as fixed-sized orifices at said constant pressure and in view of prior test data relating time to amount of ejected gas under similar conditions.

2. The subject matter of claim 1 in which the interior of said pressure regulator in contact with said chlorine gas is formed of a fluorinated material.

3. A chlorine injector for a swimming pool filled with water, comprising means to control weight of chlorine injected by measuring time of injection rather than by weighing chlorine cylinders, including:

(a) a container of liquid chlorine under pressure of chlorine vaporized into gas, a disperser tube near the bottom of said pool having outlets for chlorine gas to eject therefrom to dissolve in said water in said pool, and a transfer tube connecting said container to said disperser tube, (b) said disperser tube being formed of a fluorinated elastomer and said outlets being formed by a multiplicity of punctures formed by needles piercing said disperser tube, said punctures normally having a closed appearance but passing bubbles of chlorine gas under pressure and acting as fixed-sized orifices under a given gas pressure to limit gas flow therethrough, and (c) a pressure regulator interposed between said container and said transfer tube so that the amount of chlorine being ejected from said disperser tube into said water in said pool can be measured by time of injection in view of constant pressure in said disperser tube governed by said pressure regulator and in view of said punctures acting as fixed-sized orifices at said constant pressure and in view of prior test data relating time to amount of ejected gas under similar conditions.

4. The subject matter of claim 3 in which said punctures are made by a needle under 0.060" diameter.

5. A chlorine injector for a swimming pool filled with water, comprising means to control weight of chlorine injected by measuring time of injection rather than by weighing chlorine cylinders, including:

(a) a container of liquid chlorine under pressure of chlorine vaporized into gas, a disperser tube near the bottom of said pool having outlets for chlorine gas to eject therefrom to dissolve in said water in said pool, and a transfer tube connecting said container to said disperser tube, (b) said outlets in said disperser tube acting as fixed-sized orifices under a given gas pressure to limit gas flow therethrough, and (c) a pressure regulator interposed between said container and said transfer tube so that the amount of chlorine being ejected from said disperser tube into said water in said pool can be measured by time of injection in view of constant pressure in said disperser tube governed by said pressure regulator and in view of said outlets acting as fixed-sized orifices at said constant pressure and in view of prior test data relating time to amount of ejected gas under similar conditions.

6. The subject matter of claim 5 in which said pressure regulator is set at 30-35 psig.

7. The subject matter of claim 5 in which the interior of said pressure regulator in contact with said chlorine gas is formed of a fluorinated material.

8. The subject matter of claim 5 in which said pressure regulator includes a regulating diaphragm and a spring pressing said diaphragm and said spring being adjusted in force by shims.

9. A chlorine injector for a swimming pool filled with water, comprising outlet means in a chlorine injector that is closed except when the chlorine injector is internally pressurized with chlorine gas, including (a) a container of liquid chlorine under pressure of chlorine vaporized into gas, a disperser tube near the bottom of said pool having outlets for chlorine gas to eject therefrom to dissolve in said water in said pool, and a transfer tube connecting said container to said disperser tube, and (b) said disperser tube being formed of a fluorinated elastomer and said outlets being formed by a multiplicity of at least two hundred and fifty puncture formed by needles of under 0.060" diameter piercing said disperser tube, said punctures normally having closed appearances but passing bubbles of chlorine gas under pressure and acting as fixed-sized orifices under a given gas pressure to limit gas flow therethrough.

10. The method of injecting a selected amount of chlorine into the water in a swimming pool, comprising controlling weight of chlorine injected by measuring time of injection rather than by weighing chlorine cylinders, including:

(a) submerging in said water in said swimming pool a disperser tube having a multiplicity of outlets passing gas under pressure and acting as fixed-sized orifices under constant pressure, and (b) delivering chlorine gas under constant pressure to said disperser tube for a period of time resulting in delivery of said selected amount.

11. In the method of claim 10, forming said disperser tube of a fluorinated elastomer and forming said outlets by piercing said tube with needles.

12. The method of injecting selected amounts of chlorine into water in swimming pools, comprising controlling weight of chlorine injected by measuring time of injection rather than by weighing chlorine cylinders, including:

(a) providing a disperser tube with a multiplicity of outlets passing gas under pressure and acting as fixed-sized orifices under constant pressure, (b) submerging said disperser tube in the water of a swimming pool and charting the amount of gas delivered into the water according to length of time when gas is applied to said disperser tube under a constant pressure, and (c) delivering selected amounts of chlorine into water in swimming pools by submerging said disperser tube in the water and delivering chlorine gas to the disperser tube at said constant pressure for the lengths of time charted to deliver the selected amounts of chlorine gas.

* * * * *